(12) United States Patent
Zhao

(10) Patent No.: US 9,587,101 B2
(45) Date of Patent: Mar. 7, 2017

(54) POLYVINYL CHLORIDE MODIFIER AND COMPOSITE, AND PREPARATION METHOD THEREFOR

(71) Applicant: SHANDONG RIKE CHEMICAL CO., LTD., Weifang, Shandong (CN)

(72) Inventor: Dongri Zhao, Shandong (CN)

(73) Assignee: Shandong Rike Chemical Co., Ltd., Shandong (CN)

( * ) Notice: Subject to any disclaimer, the term of this patent is extended or adjusted under 35 U.S.C. 154(b) by 0 days.

(21) Appl. No.: 14/890,126

(22) PCT Filed: Nov. 27, 2013

(86) PCT No.: PCT/CN2013/087977
§ 371 (c)(1),
(2) Date: Nov. 9, 2015

(87) PCT Pub. No.: WO2014/180119
PCT Pub. Date: Nov. 13, 2014

(65) Prior Publication Data
US 2016/0115308 A1   Apr. 28, 2016

(30) Foreign Application Priority Data

May 9, 2013   (CN) .......................... 2013 1 0169434

(51) Int. Cl.
| | | |
|---|---|---|
| *C08L 27/00* | (2006.01) | |
| *C08L 27/06* | (2006.01) | |
| *C08F 8/22* | (2006.01) | |
| *C08L 23/28* | (2006.01) | |
| *C08F 255/02* | (2006.01) | |
| *C08L 33/12* | (2006.01) | |
| *C08K 3/00* | (2006.01) | |
| *C08L 51/06* | (2006.01) | |
| *C08L 97/02* | (2006.01) | |

(52) U.S. Cl.
CPC ............... *C08L 27/06* (2013.01); *C08F 8/22* (2013.01); *C08F 255/023* (2013.01); *C08K 3/00* (2013.01); *C08L 23/28* (2013.01); *C08L 23/286* (2013.01); *C08L 33/12* (2013.01); C08L 51/06 (2013.01); C08L 97/02 (2013.01); C08L 2201/08 (2013.01); *C08L 2205/03* (2013.01); *C08L 2205/035* (2013.01); *C08L 2205/06* (2013.01); *C08L 2207/062* (2013.01)

(58) Field of Classification Search
CPC ........ C08L 27/06; C08L 23/286; C08L 33/12; C08L 2205/06; C08L 2205/03; C08L 2207/062; C08L 2201/08
USPC .......................................................... 524/527
See application file for complete search history.

(56) References Cited

U.S. PATENT DOCUMENTS

| | | | | |
|---|---|---|---|---|
| 3,291,863 A | * | 12/1966 | Mittelberger | ............. C08F 8/20 525/195 |
| 4,433,105 A | | 2/1984 | Matsuda et al. | |
| 5,087,673 A | * | 2/1992 | Watanabe | ................ C08F 8/22 525/334.1 |

FOREIGN PATENT DOCUMENTS

| | | |
|---|---|---|
| CN | 100348658 | 11/2007 |
| CN | 102634138 A1 | 8/2012 |
| CN | 103224673 A | 7/2013 |
| GB | 1155033 A | 6/1969 |

OTHER PUBLICATIONS

International Search Report from Application No. PCT/CN2013/087966 dated Mar. 6, 2014.
International Search Report from Application No. PCT/CN2013/087977 dated Mar. 6, 2014.
Extended European Search Report in EP Application No. 13883937.8 dated Aug. 25, 2016.

* cited by examiner

*Primary Examiner* — Hui Chin
(74) *Attorney, Agent, or Firm* — Calfee, Halter & Griswold LLP

(57) ABSTRACT

The present invention discloses a polyvinyl chloride modifier, composition and a preparation method thereof. The composition comprises the following components by parts by weight: (a) polyvinyl chloride resin of 100 parts, and (b) a toughening modifier of 2-16 parts, the toughening modifier being rubber powder whose an elongation at break is greater than 2201% and which contains weight percentage of chlorine of 5-45 wt %. The elongation at break of the polyvinyl chloride composition of the present invention is greatly improved, and the defect of low elongations at break of polyvinyl chloride product is substantially solved accordingly, therefore, the application scope of polyvinyl chloride surely will be greatly widened.

17 Claims, No Drawings

POLYVINYL CHLORIDE MODIFIER AND COMPOSITE, AND PREPARATION METHOD THEREFOR

CROSS-REFERENCE TO RELATED APPLICATION

This application is the U.S. national phase entry of PCT/CN2013/087977, with an international filing date of 27 Nov. 2013, which claims the benefit of Chinese Application Serial No. 201310169434.X, with a filing date of 9 May 2013, the entire disclosures of which are fully incorporated herein by reference.

FIELD OF THE INVENTION

The present invention relates to a polyvinyl chloride modifier, composition and preparation method thereof, especially to a polyvinyl chloride modifier with high elongation at break, a polyvinyl chloride composition with good toughness at low temperature and preparation method thereof.

BACKGROUND OF THE INVENTION

Polyvinyl chloride (PVC) resins generally have the following drawbacks: 1. Poor processability; 2. Poor impact strength at low temperature; 3. Poor heat stability; 4. Poor toughness at low temperature. At present, a variety of methods have been invented to improve the drawbacks of polyvinyl chloride resins, such as: adding additives to improve the processability of polyvinyl chloride resins; adding anti-impact modifiers to improve the anti-impact property of polyvinyl chloride resins at low temperature; adding heat stabilizers to improve the heat stability of polyvinyl chloride resins. However, the problem of the toughness of polyvinyl chloride resins at low temperature has not been well solved so far. And the problem of the toughness of polyvinyl chloride resins has become the major barrier for the development of polyvinyl chloride resins. For example, in the field of materials of the pipes for supplying water, polyvinyl chloride pipe materials have been gradually replaced by polyethylene (PE) pipe materials, mainly because bend deformations of polyvinyl chloride pipe materials buried under ground happen when terrain changes by time. As the toughness of polyvinyl chloride at low temperature is low, polyvinyl pipe materials will be easily broken by a slight bend; however, as the elongation at break for PE is high, PE pipe materials will not be broken even when the PE pipe materials bend because of the change of terrain. Therefore, for long-distance water supplying systems, PE pipe materials are usually preferred. Moreover, the major reason that wood materials cannot be replaced by polyvinyl chloride products is that polyvinyl chloride products will be easily cracked while inserting nails, and the fundamental reason for such phenomenon is the low elongation at break and the poor toughness of polyvinyl chlorides. Besides, cracking of the welding angles of the polyvinyl chloride doors and windows happens easily in winter when temperature is very low, which is also mainly because of the low elongation at break and the poor toughness of polyvinyl chlorides.

For a long period of time, there's a big misunderstanding in the field of modifying polyvinyl chlorides: mistakenly, it is considered that increasing the notch impact strength of polyvinyl chlorides is the same as increasing the toughness of polyvinyl chlorides; and mistakenly, it is considered that increasing the impact strengths of polyvinyl chlorides will increase the toughnesses of polyvinyl chlorides, thus increase the low temperature resistances of polyvinyl chlorides, therefore solve the problem of polyvinyl chloride pip materials such as cracking. Therefore, acrylates anti-impact modifiers (anti-impact ACR), methyl methacrylate-styrene-butadiene copolymers (MBS) anti-impact modifiers are usually used to increase the impact strengths of polyvinyl chlorides. However, although anti-impact ACR and MBS can largely increase the notch impact strengths of polyvinyl chlorides, they can hardly effectively improve the toughnesses of polyvinyl chlorides, especially the toughnesses under low temperature, which is not satisfying. Thus, currently, the elongations at break of polyvinyl chloride resins are not the same as or close to that of polyethylene, and the nail-holding abilities of polyvinyl chlorides are not the same as that of wood material.

SUMMARY OF THE INVENTION

While disregarding the above misunderstanding, the present invention discovered that the toughnesses of rigid non-plasticized polyvinyl chloride compositions are closely related to the elongations at break of the blend of polyvinyl chlorides and polyvinyl chloride toughening modifiers based on a great amount of studies. The higher the elongations at break of polyvinyl chloride compositions are, the better the toughnesses are. And the toughnesses of polyvinyl chloride compositions are associated with the elongations at break of polyvinyl chloride toughening modifiers, the higher the elongations at break of polyvinyl chloride toughening modifiers are, the higher the elongations at break of the non-plasticized polyvinyl chloride compositions are. Thus the elongations at break of polyvinyl chloride toughening modifiers must be improved to increase the toughnesses of the non-plasticized polyvinyl chloride compositions.

However, due to the limitation of the structure of synthesizing reactor of polyvinyl chloride toughening modifiers, it is very difficult to increase the elongations at break of the toughening modifiers when the elongation at break thereof is increased by 2200%. This is because the viscosity of the reaction solution is too high while producing toughening modifiers with high elongation, a very high stirring strength and a very high stirring rate are required to achieve the ideal dispersing effect of chlorine gas and reaction solution; in the reactors used previously, only stirring rakes that are fixed on top of the reactors and allow movements of the bottom are equipped. For such reactors, under a high stirring strength and a high stirring rate, the phenomenon that stirring rakes sway and reactors shake will happen easily, and so do industrial accidents, resulting in serious chlorine gas leak and safety problems. The present invention significantly increases the stirring strength by using modified reactors, and increases the elongations at break of toughening modifiers to above 2201% by using high density polyethylene (HDPE) with smaller particle size as raw materials.

The inventor developed rubber powders (toughening modifiers) that are well compatible with polyvinyl chloride resins and with very high elongations at break. To complete the present invention, said powders will be added into polyvinyl chloride resins to further increase the elongations at break of polyvinyl chloride compositions and further improve the toughnesses at low temperature of the polyvinyl chloride resins.

One of the objects of the invention is to provide a polyvinyl chloride composition, from which the polyvinyl chloride products prepared possess good toughness at low temperature.

Another object of the invention is to provide a preparation method of polyvinyl chloride compositions with simple process applied, and in the method, by adjusting reacting conditions, the elongations at break of rubber powders can be controlled, thus the toughnesses of the polyvinyl chloride compositions at low temperature can be controlled.

Yet another object of the invention is to provide a toughening modifier, which possesses a very high elongation at break.

Another object of the invention is to provide a preparation method of toughening modifiers with simple process, in the method, by adjusting reacting conditions, the elongations at break of rubber powders can be controlled, The present invention can achieve the above objects by using the following technical solutions.

The present invention provides a polyvinyl chloride composition comprising the following components based on parts by weight:
(a) 100 parts polyvinyl chloride resin, and
(b) 2-16 parts toughening modifier;
wherein said toughening modifier is rubber powders with an elongation at break greater than 2201% and 5-45 wt % weight percentage of chlorine;
said elongation at break is tested by GB/T528-2009;
the weight percentage of chlorine is tested by the method A of GB/T7139-2002.

Preferably, based on parts by weight, the polyvinyl chloride composition according to the present invention further comprises the following components:
(c) 0.5-5 parts stabilizer,
(d) 0-50 parts filler, and
(e) 0-50 parts wood powder, and
(f) 0-10 parts polymers that comprise acrylates, and
(g) 0-8 parts anti-impact modifier, and
(h) 0-5 parts lubricant, and
(i) 0-10 parts pigment.

According to the polyvinyl chloride composition of the present invention, preferably, said polyvinyl chloride resin is a polyvinyl chloride homopolymer or a polyvinyl chloride copolymer; wherein, polyvinyl chloride copolymer comprises 80-99.99 wt % vinyl chloride units and 0.01-20 wt % units that are formed by other units;
said other units are selected from one or more of vinyl acetate, propylene, styrene, $C_1$-$C_{12}$ alkyl esters of methacrylic acid, $C_1$-$C_{12}$ alkyl esters of acrylic acid.

According to the polyvinyl chloride composition of the present invention, preferably, said toughening modifier is selected from the group consisting of the following substances: chlorinated polyethylenes, copolymers of chlorinated polyethylene and (meth)acrylate or the mixtures of chlorinated polyethylene and (meth)acrylate polymer.

According to the polyvinyl chloride composition of the present invention, preferably, in said toughening modifiers, based on the total weight of the toughening modifier, the weight percentage of alkyl(meth)acrylate is 0-50 wt %.

The polyvinyl chloride composition according to the present invention, preferably,
said stabilizer is selected from organotin heat stabilizers, calcium-zin stabilizers or lead salt stabilizers;
said filler is selected from calcium carbonate, talc powder or white carbon black;
said polymers that comprise acrylates are selected from copolymers that comprise alkyl methacrylates and alkyl acrylates;
said anti-impact modifier is selected from copolymers that is formed by methyl methacrylate, styrene and butadiene.

said lubricant is selected from oxidized polyethylene wax, polyethylene wax, paraffin, stearic acid, glycerol monostearate, pentaerythritol stearate, pentaerythritol adipate or calcium stearate;
said pigment is selected from titanium white, carbon black, ultramarine pigment or fluorescent whitener.

The present invention further provides a preparation method for the above polyvinyl chloride compositions, said preparation method comprises preparation steps of toughening modifier, which can be specified as follows:

0.01-1.00 parts by weight of dispersing agent, 0.01-1.00 parts by weight of emulsifying agent are added to the reactor that is resistant to the erosion of chloric acid and is equipped with a stirring rake, then a dispersing medium is added, the total parts by weight of the dispersing agent, the emulsifying agent and the a dispersing medium are 250 parts by weight; then 15-40 parts by weight of high density polyethylene, 0.01-0.5 parts by weight of initiating agent are added, the temperature of the reaction materials are increased to 80-135° C. under the stirring rate of 30-300 rounds/min; then 5-25 parts by weight of chlorine gas are inlet, the inlet rate of chlorine gas must keep the reaction pressure to rise smoothly but not higher than the corresponding saturated steam pressure 0.05 MPa; the amount of the chlorine inlet must satisfy that below 50% of the total amount of chlorine gas are inlet below 135° C., and above 50% of the total amount of chlorine gas are inlet above 135° C.

According to the present invention, another preparation method for the above polyvinyl chloride compositions is provided, said preparation method comprises preparation steps of toughening modifier, which can be specified as follows:
(1) Preparation of Chlorinated Polyethylene:

0.01-1.00 parts by weight of dispersing agent, 0.01-1.00 parts by weight of emulsifying agent are added to the reactor that is resistant to the erosion of chloric acid and is equipped with a stirring rake, then a dispersing medium is added, the total parts by weight of the dispersing agent, the emulsifying agent and the dispersing medium are 250 parts by weight; then 15-40 parts by weight of high density polyethylene, 0.01-0.5 parts by weight of initiating agent are added, the temperature of the reaction materials are increased to 80-135° C. under the stirring rate of 30-300 rounds/min; then 5-25 parts by weight of chlorine gas are inlet, the inlet rate of chlorine gas must keep the reaction pressure to rise smoothly but not higher than the corresponding saturated steam pressure 0.05 MPa; the amount of the chlorine inlet must satisfy that below 50% of the total amount of chlorine gas are inlet below 135° C., and above 50% of the total amount of chlorine gas are inlet above 135° C.
(2) Preparation of Chlorinated Polyethylene and (Meth) Acrylate Copolymers 0.01-1.00 parts by weight of dispersing agent, 0.01-0.50 parts by weight of initiating agent and a dispersing medium are added to the reactor, wherein the total parts by weight of the dispersing agent, the initiating agent and the dispersing medium are 250 parts by weight; then 15-40 parts by weight of chlorinated polyethylene obtained in step (1), 0-0.50 parts by weight of emulsifying agent are added, the stirring rate is maintained at 30-300 rounds/min, then 1-40 parts by weight of alkyl(meth)acrylate is added after the temperature of the reaction materials are increased to 70-90° C., the reaction temperature is maintained at 80-85° C., after 2-5 hours of reaction, the temperature is cooled to below 40° C.

According to the preparation methods of the polyvinyl chloride compositions of the present invention, preferably, the medium interface of the reactor is made of titanium-palladium alloy, zirconium or tantalum; said stirring rake is a zirconium-made stirring rake that is resistant to the erosion of chloric acid and the top and bottom ends of the stirring rake are fixed to the top and bottom of the reactor respectively and it can rotate freely.

According to the preparation methods of the polyvinyl chloride compositions of the present invention, preferably, the average particle size D50 of said high density polyethylene is 40-140 μm;

the average particle size is obtained by Taylor Sieve Method, the measurement is made specifically as follows: 200 g high density polyethylene is screened for 10 minutes by vibrating screening on different sieves, then the weight of the particles on the sieve is weighed, the particle size when particles that are 50% of the weight of the particles are screened is chosen to be the average particle size D50.

According to the preparation methods of the polyvinyl chloride compositions of the present invention, preferably, the melt index of said high density polyethylene is 0.2-4.0 g/10 min; said melt index is measured by ASTM D1238, the temperature is 190° C., the load is 5.0 kg.

The present invention also provides a toughening modifier, said toughening modifier is selected from chlorinated polyethylene, or copolymer of chlorinated polyethylene and (meth)acrylate; said toughening modifier is rubber powders with an elongation at break higher than 2201% and 5-45 wt % weight percentage of chlorine;

said elongation at break is measured by GB/T528-2009;

the weight percentage of chlorine is measured by the method A of GB/T7139-2002.

The present invention also provides a preparation method of the above toughening modifier, said toughening modifier is chlorinated polyethylene, and preparation steps can be specified as follows:

0.01-1.00 parts by weight of dispersing agent, 0.01-1.00 parts by weight of emulsifying agent are added to the reactor that is resistant to the erosion of chloric acid and is equipped with a stirring rake, then a dispersing medium is added, the total parts by weight of the dispersing agent, the emulsifying agent and the dispersing medium are 250 parts by weight; then 15-40 parts by weight of high density polyethylene, 0.01-0.5 parts by weight of initiating agent were added, the temperature of the reaction materials are increased to 80-135° C. under the stirring rate of 30-300 rounds/min; then 5-25 parts by weight of chlorine gas are initially inlet, the inlet rate of chlorine gas must keep the reaction pressure to rise smoothly but not higher than the corresponding saturated steam pressure 0.05 MPa; the amount of the chlorine inlet must satisfy that below 50% of the total amount of chlorine gas are inlet below 135° C., and above 50% of the total amount of chlorine gas are inlet above 135° C.

The present invention also provides another preparation method of the above toughening modifier, said toughening modifier is a copolymer of chlorinated polyethylene and (meth)acrylate, preparation steps are specified as follows:

(1) Preparation of Chlorinated Polyethylene 0.01-1.00 parts by weight of dispersing agent, 0.01-1.00 parts by weight of emulsifying agent are added to the reactor that is resistant to the erosion of chloric acid and is equipped with a stirring rake, then a dispersing medium is added, the total parts by weight of the dispersing agent, the emulsifying agent and the dispersing medium are 250 parts by weight; then 15-40 parts by weight of high density polyethylene, 0.01-0.5 parts by weight of initiating agent are added, the temperature of the reaction materials are increased to 80-135° C. under the stirring rate of 30-300 rounds/min; then 5-25 parts by weight of chlorine gas are inlet, the inlet rate of chlorine gas must keep the reaction pressure to rise smoothly but not higher than the corresponding saturated steam pressure 0.05 MPa; the amount of the chlorine inlet must satisfy that below 50% of the total amount of chlorine gas are inlet below 135° C., and above 50% of the total amount of chlorine gas are inlet above 135° C.

(2) Preparation of Chlorinated Polyethylene and (Meth)Acrylate Copolymers 0.01-1.00 parts by weight of dispersing agent, 0.01-0.50 parts by weight of initiating agent and dispersing medium are added to the reactor, wherein the total parts by weight of the dispersing agent, the initiating agent and the a dispersing medium are 250 parts by weight; then 15-40 parts by weight of chlorinated polyethylene obtained in step (1), 0-0.050 parts by weight of emulsifying agent are added, the stirring rate is maintained at 30-300 rounds/min, then 1-40 parts by weight of alkyl(meth)acrylate is added after the temperature of the reaction materials are increased to 70-90° C., the reacting temperature is maintained at 80-85° C., after 2-5 hours of reaction, the temperature is cooled to below 40° C.

The present invention fundamentally solves the defects of low elongation at break and poor toughness at low temperature of polyvinyl chloride products, which allow the elongations at break of non-plasticized polyvinyl chloride products to reach above 233% while maintaining the mechanical property of polyvinyl chloride products unchanged, which fundamentally solves the problem of poor toughness at low temperature and easily stress cracked of polyvinyl chloride products, thus achieving a replacement of materials such as polyethylene, wood and metal by polyvinyl chlorides.

DETAILED DESCRIPTION OF THE INVENTION

In the present invention, (meth)acrylates represent acrylates and/or methacrylates. (Meth)acrylic acid represent acrylic acid and/or methyl acrylic acid. In the present invention, unless otherwise defined, "parts" and "%" are all based on weight.

Impact strength and toughness are two different concepts, but in the prior art, it has been taught for a long time that toughness can be improved by increasing impact strength. The essence of impact strength is the ability to transform impact energy into heat energy when the material is impacted; whereas the essence of toughness is elongation at break and tensile strength. The larger the tensile strength is and the higher the elongation at break, the better the toughness of the material is. Therefore, toughness can be understood as the ability of quickly generating deformation and relieving stress when material is under stress or there's stress inside. In the present invention, it is discovered that impact strength is closely related to phase structure of material, toughness is closely related to elongation at break of material, thus elongation at break must be increased in order to increase toughness of material.

Compared with traditional polyvinyl chloride compositions, the present invention can further improve elongations at break of polyvinyl chloride products by adding high molecular polymers that are well compatible with polyvinyl chloride resins and with very high elongations at break into polyvinyl chloride resins.

<Polyvinyl Chloride Compositions>

The polyvinyl chloride compositions of the present invention comprise polyvinyl chloride resins and toughening modifiers. Optionally, the present invention can also comprise one or more other additives including the following components: stabilizers, fillers, wood powder, polymers that comprise acrylates, anti-impact modifiers, lubricants, pigments. Preferably, the polyvinyl chloride compositions of the present invention comprise polyvinyl chloride resins, toughening modifiers and stabilizers. More preferably, the polyvinyl chloride compositions of the present invention comprise polyvinyl chloride resins, toughening modifiers, stabilizers and anti-impact modifiers. More preferably, the polyvinyl chloride compositions of the present invention comprise polyvinyl chloride resins, toughening modifiers, stabilizers, anti-impact modifiers and lubricants.

Preferably, the elongations at break of the polyvinyl chloride compositions of the present invention can reach to above 233%, and above 250%, even above 300%. Said elongations at break are measured according to GB/T 1040.1-2006. The experiment are carried out under the conditions according to the regulations of GB/T1040.2-2006, the samples are 18 type dumb-bell shape samples. The stretching velocity of the experiment machine is 5 mm/min. The experiment temperature follows the regulation of GB/T2918-1998, the temperature is 24° C.-25° C.; the relative humidity is 50±5%.

The characteristics of the present invention lie in using rubber powders that have the elongation at break greater than 2201% and are well compatible with polyvinyl chloride resins as the toughening modifiers for polyvinyl chloride resins, said rubber powders can be any component as long as it can be well compatible with polyvinyl chloride resins and can be homogeneously dispersed into polyvinyl chloride resins under general processing conditions. For example, it can be chlorinated polyethylene, graft copolymer of chlorinated polyethylene and (meth)acrylates, interpenetrating copolymer networks of chlorinated polyethylene and (meth)acrylate or compositions of chlorinated polyethylene and (meth)acrylate copolymers etc. The elongation at break of polyvinyl chlorides will be improved largely without significantly influencing the other physical and chemical properties of polyvinyl chlorides as long as the elongations at break of the above modifiers are higher than 2201%.

The polyvinyl chloride toughening modifier of the present invention is a component that is added to increase the elongation at break of polyvinyl chloride resin, and is a kind of rubber powders that are well compatible with polyvinyl chloride resins, the major components of the polyvinyl chloride toughening modifier can be chlorinated polyethylene, copolymer of chlorinated polyethylene and alkyl(meth)acrylate, or compositions of chlorinated polyethylene and alkyl(meth)acrylate polymers. The importance is that the elongations at break of these rubber powders are relatively high, which are higher than 2201%.

There's no special limitation for the methods for the preparation of the polyvinyl chloride resin compositions of the present invention, for example, said methods can be carried out as long as polyvinyl chloride resins, toughening modifiers and other additives that can be added optionally are homogeneously mixed. Preferably, the preparation method of the composition can be mixing polyvinyl chlorinated resins, toughening modifiers and other additives that can be optionally added with high-speed stirrer under suitable temperature then cooling the mixture with low-speed stirrer to obtain polyvinyl chloride compositions.

There's no specially limitation for the method for forming the polyvinyl chloride resin composition of the present invention, said composition can be formed by general methods such as extrusion molding or injection molding.

<Polyvinyl Chloride Resin>

There's no special limitation for polyvinyl chloride resin of the present invention, any common polyvinyl chloride resins can be used in the present invention. The polyvinyl chloride resin of the present invention can be polyvinyl chloride homopolymers or polyvinyl chloride copolymers. Wherein preferred polyvinyl chloride copolymer may comprises 80-99.99 wt % chlorinated ethylene unit and 0.01-20 wt % units that are formed by other units. The preferred polyvinyl chloride copolymer can be obtained by the copolymerization of 80-99.99 wt % chlorinated ethylene units with 0.01-20 wt % other units that can be copolymerized with chloroethylene. Here the above preparation methods won't be further described as they are those that are known in the art. The other units that can be copolymerized with chloroethylene can be vinyl acetate, propylene, styrene, alkyl(meth)acrylate (for example, $C_1$-$C_{12}$ alkyl methacrylates) or other vinyl monomer. These monomers can be used separately or in combination, wherein the alkyl of the alkyl ester thereof is preferably $C_1$-$C_{12}$ alkyls, $C_1$-$C_5$ alkyls and $C_{1-3}$ alkyls. The examples of alkyls include but are not limited to methyl, ethyl, propyl, butyl, pentyl, hexyl, heptyl, octyl, nonyl, decyl, hendecyl, dodecyl.

There's not special limitation for the average degree of polymerization of the polyvinyl chloride of the present invention. For example, polyvinyl chloride resin with the degree of polymerization between 600-1300, preferably between 700-1100, most preferably between 800-1000 can be used. However, if the degree of polymerization is lower than 600, the mechanical property of the polyvinyl chloride products will be largely decreased; and if the degree of polymerization is higher than 1300, general methods cannot be used for processing.

Preferably, the polyvinyl chloride resins of the present invention are homopolymers or copolymers that comprise no less than 80 wt % chloroethylene monomer units and no more than 20 wt % vinyl acetate, propylene, styrene or acrylate monomer units. If the weight percentage of chloroethylene monomer units is lower than 80 wt %, the mechanical property of the polyvinyl chloride resin will be decreased. Preferably, the content of chloroethylene monomer units is above 80 wt %, preferably above 90 wt %, most preferably above 95 wt %, based on the total monomer units of polyvinyl chloride resin. Preferably, the degree of polymerization of the above polyvinyl chloride resin is between 600-1300.

<Toughening Modifiers>

The polyvinyl chloride composition of the present invention comprises, based on (a) 100 parts by weight of polyvinyl chloride resin, (b) 2-16 parts by weight of toughening modifier. When the amount of the toughening modifier is lower than 2 parts by weight, the elongation of polyvinyl chloride will largely decrease; when the amount of the toughening modifier is higher than 16 parts by weight, the processability of the polyvinyl chloride composition will largely decrease. Based on (a) 100 parts by weight of polyvinyl chloride resin, the amount of use of toughening modifier is preferably 5-14 parts by weight, most preferably 7-12 parts by weight.

The toughening modifier used in the present invention is rubber powders. The elongation at break for the toughening modifier of the present invention is larger than 2201%, preferably 2220%-3500%, more preferably 2300%-2950%. In this case, advantageously, the elongation at break of polyvinyl chloride composition and thus the toughness at low temperature thereof will be improved. Here the elongation at break is measured by GB/T528-2009.

The weight percentage of chlorine of the toughening modifier used in the present invention is 5-45 wt %. The chlorine weight percentage represents the percentage of the weight of chlorine elements in the total weight of toughening modifier. The chlorine weight percentage of the present invention is measured by the method A of GB/T7139-2002 (The measurement of the chlorine content of plastic chloroethylene homopolymers and copolymers). When the content of chlorine is lower than 5 wt %, the toughening modifier is not compatible with polyvinyl chloride resin and cannot be dispersed homogeneously with polyvinyl chloride resin to form net structure. In such circumstance, the property of the polyvinyl chloride composition will be largely decreased. If the chlorine content is beyond 45 wt %, then the elongation at break of the toughening modifier will be largely decreased, and the hardness will be greatly increased, and the mechanical property of the polyvinyl chloride composition will be largely decreased. The chlorine weight percentage of the toughening modifier of the present invention is preferably 10-40 wt %, most preferably 25-35 wt %.

There's no special limitation for the types of the toughening modifiers of the present invention, any polymers with an elongation at break larger than 2201% and 5-45% chlorine weight percentage can be used. Preferably, toughening modifiers used in the present invention can be selected from those polymers that can be mixed with polyvinyl chloride resins and dispersed homogeneously. More preferably, toughening modifiers used in the present invention can be selected from the group consisting of the following substances: chlorinated polyethylenes, copolymers of chlorinated polyethylene and (meth)acrylate or the compositions of chlorinated polyethylene and (meth)actylate polymer. More preferably, the toughening modifiers used in the present invention are selected from chlorinated polyethylene, graft copolymers of chlorinated polyethylene and (meth) actylate, interpenetrating polymer networks of chlorinated polyethylene and (meth)actylates, or compositions of chlorinated polyethylene and (meth)acrylate copolymers. These polymers can be dispersed completely and homogeneously with polyvinyl chloride resin under general processing conditions. The toughening modifiers of the present invention are not limited to the above polymers, the polymers that can be mixed with polyvinyl chloride resins and dispersed homogeneously under general processing conditions and with an elongation at break larger than 2201% can also be used.

In the toughening modifier of the present invention, based on the total weight of the toughening modifier, the weight percentage of alkyl(meth)acrylate is 0-50 wt %. When the weight percentage of alkyl(meth)acrylate is greater than 50%, the powder flowdability of the material will decrease, the toughening modifier cannot be homogeneously mixed with polyvinyl chloride resin. Therefore, the content of alkyl(meth)acrylate is 0-50 wt %, preferably 5-30%, most preferably 5-15 wt %. Wherein the alkyls in the alkyl esters comprise but are not limited to $C_1$-$C_{12}$ alkyls. The examples of alkyls can be but are not limited to methyl, ethyl, propyl, butyl, pentyl, hexyl, heptyl, octyl, nonyl, decyl, hendecyl, dodecyl.

As toughening modifiers added into the polyvinyl chloride resin compositions, the average particle sizes (D50) of the toughening modifiers are preferably 160-650 μm, more preferably 200-600 μm, even more preferably 230-550 μm. The smaller the particle sizes of the toughening modifiers are, the better the dispersities of the toughening modifiers in the polyvinyl chloride resins are, the better the net structures formed are, the longer the elongations of the polyvinyl chloride resin compositions are, the better the toughnesses of the polyvinyl chloride products are. However, if the particle sizes are too small, the powders will easily agglomerate, resulting in that the formed products cannot be used; if the powders are too large, then the toughening agent cannot be dispersed completely into polyvinyl chloride resins. The particle size of the toughening modifier is measured by Taylor Sieve Method. The measurement method can be specified as follows: 200 g sample is screened for 10 minutes by vibrating screening on different sieves, then the weight of the particles on the sieve is weighed, the particle size when particles that are 50% of the weight of the particles are screened is chosen to be the average particle size D50.

<Other Additives>

The polyvinyl chloride compositions of the present invention can comprise, based on (a) 100 parts by weight of polyvinyl chloride resin, (c) 0.5-5 parts by weight, preferably 1-4 parts by weight, more preferably 2-3 parts by weight of stabilizer. There's not special requirement for the stabilizers used in the present invention. Preferably, the stabilizer used in the present invention can be organotin heat stabilizer, calcium-zinc stabilizer or lead salt stabilizer etc. The calcium-zinc stabilizer comprises components such as calcium salt, zinc salt, lubricant, antioxidant as the major components and said stabilize is synthesized by a complex technique which won't be described here.

The polyvinyl chloride compositions of the present invention can comprise, based on (a) 100 parts by weight of polyvinyl chloride resin, (d) 0-50 parts by weight, preferably 1-40 parts by weight, more preferably 5-30 parts by weight of filler. There's not special requirement for the types of the fillers used in the present invention, the filler is preferably inert, i.e. the filler doesn't react with the component in the polyvinyl chloride composition. Preferably, the filler can be calcium carbonate, talc powder, carbon black or white carbon black etc.

The polyvinyl chloride compositions of the present invention can comprise, based on (a) 100 parts by weight of polyvinyl chloride resin, (e) 0-50 parts by weight, preferably 1-40 parts by weight, more preferably 5-30 parts by weight of wood powders. Any wood powders can be used in the present invention.

The polyvinyl chloride compositions of the present invention can comprise, based on (a) 100 parts by weight of polyvinyl chloride resin, (f) 0-10 parts by weight, preferably 0.2-5.0 parts by weight, more preferably 0.5-2.0 parts by weight of polymers that comprise acrylates. Generally, polymers that comprise acrylates can improve the processability of polyvinyl chloride compositions, the more the amount of use is, the better the processability is, but the cost will also be increased. Therefore, under the circumstance that the processability of the polyvinyl chloride compositions can be ensured, the amount of use is the less the better. The polymer that comprises acrylates of the present invention represents polymers comprising (meth)acrylate monomer units. The polymers comprising acrylates of the present invention is preferably the polymers that comprise alkyl methacrylates and alkyl acrylates, wherein the alkyls in the alkyl ester are preferably $C_1$-$C_{12}$ alkyls, $C_1$-$C_5$ alkyls, $C_1$-$C_3$ alkyls. The examples of the alkyls comprise but are not limited to: methyl, ethyl, propyl, butyl, pentyl, hexyl, heptyl, octyl, nonyl, decyl, hendecyl, dodecyl.

The polyvinyl chloride compositions of the present invention can comprise, based on (a) 100 parts by weight of polyvinyl chloride resin, (g) 0-8 parts by weight, preferably 1-6 parts by weight, more preferably 2-4 parts by weight of anti-impact modifier. When the amount of use of anti-impact modifier is larger than 8 parts, the tensile strength, the hardness, the Vicat softening point will decrease greatly. There's no special limitation for the types of the anti-impact modifiers of the present invention, the materials that can increase the notch impact strength of polyvinyl chloride can be used. Preferably, the anti-impact modifier of the present invention can be acrylate anti-impact modifier, terpolymers of methactylate-styrene-butadiene (MBS) etc.

The polyvinyl chloride compositions of the present invention can comprise, based on (a) 100 parts by weight of polyvinyl chloride resin, (h) 0-5 parts by weight, preferably 0.1-3 parts by weight, more preferably 0.5-2 parts by weight of lubricants. The lubricants of the present invention can be selected from one or more oxidized polyethylene wax, polyethylene wax, paraffin, stearic acid, monoglyceric stearat, pentaerythrite stearate, pentaerythrite adipate or calcium stearate.

The polyvinyl chloride compositions of the present invention can comprise, based on (a) 100 parts by weight of polyvinyl chloride resin, (i) 0-10 parts by weight, preferably 1-8 parts by weight, more preferably 2-5 parts by weight of pigments. Preferably, the pigments of the present invention can be selected from one or more of titanium white, carbon black, ultramarine pigment or fluorescent whitener.

<Preparation of Toughening Modifiers>

There's no special limitation for the preparation method of the toughening modifier used in the present invention, any rubber powder that have an elongation at break larger than 2201% and with a chlorine weight percentage of 5-45% can be used. The preparation method of the toughening modifiers will be illustrated below.

(1) Polyvinyl Chloride can be Prepared According to the Following Method:

0.01-1.00 parts by weight of dispersing agent, 0.01-1.00 parts by weight of emulsifying agent are added to the reactor that is resistant to the erosion of chloric acid and is equipped with a stirring rake with both the top and the bottom ends fixed and a high stirring intensity, then a dispersing medium is added, the total parts by weight of the three auxiliary raw material are 250 parts by weight; then 15-40 parts by weight of high density polyethylene, 0.01-0.5 parts by weight of initiating agent are added, the temperature of the reaction materials are increased to 80-135° C. under the stirring rate of 30-300 rounds/min (the homogeneous mixing of the reaction solution and chlorine gas can be ensured by adjusting the stirring rate), then 5-25 parts by weight of chlorine gas are inlet, the inlet rate of chlorine gas must keep the reaction pressure to rise smoothly but not higher than the corresponding saturated steam pressure 0.05 MPa; the amount of the chlorine inlet must satisfy that below 50% of the total amount of chlorine gas are inlet below 135° C., and above 50% of the total amount of chlorine gas are inlet above 135° C. The rubber powder with an elongation at break larger than 2201% is obtained by centrifugation and drying. Preferably, below 50% of the total amount of chlorine gas can be inlet first within 1 hour and the temperature can be increased to 135-145° C., then keep the reacting temperature above 135° C., the rest chlorine gas that represents above 50% of the total amount of chlorine gas are inlet.

The chlorinated polyethylene rubber powders obtained in step (1) can be directly used to toughen and modify polyvinyl chloride resins at low temperature. Besides, copolymers of chlorinated polyethylene and (meth)acrylate can be obtained by grafting or interpenetrating network copolymerization between the chlorinated polyethylene rubber powders obtained in the above step (1) and alkyl(meth)acrylate, to form rubber powders with an elongation at break larger than 2201%.

(2) Copolymers of Chlorinated Polyethylene and (Meth) Acrylate are Prepared According to the Following Method:

0.01-1.00 parts by weight of dispersing agent, 0.01-0.50 parts by weight of initiating agent and a dispersing medium are added to the reactor, the total parts by weight of the three auxiliary raw materials are 250 parts by weight; then 15-40 parts by weight of chlorinated polyethylene obtained in step (1), 0-0.50 parts by weight of emulsifying agent are added, the stirring rate is maintained at 30-300 rounds/min, then 1-40 parts by weight of alkyl(meth)acrylate is added after the temperature of the reaction materials is increased to 70-90° C., the reaction temperature is maintained at 80-85° C., after 2-5 hours of reaction, the temperature is cooled to below 40° C. The polymer rubber particle with an elongation at break larger than 2201% is obtained by centrifugation and drying.

While producing the toughening modifiers of the present invention, the average particle size Dn (preferably D50) of the above high density polyethylene can be between 40-140 μm. When the particle size of the high density polyethylene is smaller than 40 μm, the viscosity of the reaction solution during the process of chlorination is too large, and it is difficult to stir the reaction, and the reaction solution is poorly mixed, and the chlorinated reaction can hardly be carried out homogeneously. If the average particle size of the high density polyethylene is larger than 140 μm, even the viscosity of the reaction solution is not high, as chlorine gas is hard to enter HDPE, the rate of reaction of chlorination is slowed, and the homogeneity of chlorination is decreased, resulting in the decrease of the property of toughening modifier. The average particle size D50 of the HDPE used in the production of the toughening modifier of the present invention is between 40-140 μm, preferably between 50-120 μm, most preferably between 60-100 μm.

The above particle sizes are obtained by Taylor Sieve Method, the measurement method can be specified as follows: 200 g high density polyethylene is screened for 10 minutes by vibrating screening on different sieves, then the weight of the particles on the sieve is weighed, the particle size when the particles that are 50% of the weight of the particles are screened is chosen to be the average particle size D50.

When producing the toughening modifier of the present invention, the melt index of the above high density polyethylene (HDPE) is 0.2-4.0 g/10 min. When the melt index is lower than 0.2 g/10 min, the compatibility between the toughening modifier and the polyvinyl chloride resin will be decreased and the toughening modifier cannot be dispersed into polyvinyl chloride resin, thus the mechanical property of the material will be decreased; when the melt index is higher than 4.0 g/10 min, then the mechanical property of the polyvinyl chloride composition, such as the tensile strength will be largely decreased. Therefore, the melt index of HOPE is 0.2-4.0 g/10 min, preferably 0.3-3.0 g/10 min, more preferably 0.4-1.0 g/10 min. The above melt index is measured with ASTM 01238.

While producing the toughening modifier of the present invention, the material of the reactor of the present invention is preferably the explosive composite material. The medium interface of the above reactor is made of a material that is resistant to the erosion of chloric acid, for example, the material can be selected from titanium-palladium alloy, zirconium material or tantalum material. The bonding layer is an explosive composite bonding layer that is made purely by titanium, the bearing layer is made of carbon steel. The top and bottom ends of the stirring rake(s) of the reactor are fixed on the top and bottom of the reactor. Said stirring rake(s) can stir freely at a high speed. The stirring rake is a high stirring strength rake that is resistant to the erosion of chloric acid, such as stirring rake made of zirconium material. The inventor found that while producing chlorinated polyethylene with high elongation at break, the viscosity of the reaction liquid is very high, thus a very high stirring intensity and a very high stirring rate are required to ensure that chlorine gas is homogeneously mixed with reacting liquid, however, for those commonly used stirring rakes that are fixed to the top of the reactors, the stirring rakes will easily sway, thus resulting in the violent shaking of the reactor and the damage of the reactors. Therefore, stirring rakes with both the top and the bottom ends fixed and a high stirring intensity are preferably used.

In the preparation processes of the toughening modifiers of the present invention, the dispersing medium that is generally used is water.

In the preparation processes of the toughening modifiers of the present invention, the type of dispersing agents is not specially limited. For example, the dispersing agent can comprise copolymer of water-soluble alkyl(meth)acrylate and (meth)acrylate. Moreover, the dispersing agent can comprise the mixture of copolymer of water-soluble alkyl (meth)acrylate and (meth)acrylate and white carbon black, wherein the alkyls in the alkyl esters are preferably $C_1$-$C_{12}$ alkyls, $C_1$-$C_5$ alkyls and $C_1$-$C_3$ alkyls. The examples of alkyls can be but are not limited to methyl, ethyl, propyl, butyl, pentyl, hexyl, heptyl, octyl, nonyl, decyl, hendecyl, dodecyl.

In the preparation processes of the toughening modifiers of the present invention, the type of emulsifying agent is not specially limited. For example, the emulsifying agent can comprise polyoxyethylene alkyl ether, polyoxyethylene aliphatate or lauryl sodium sulfate.

In the preparation processes of the toughening modified of the present invention, the initiating agent can be water-soluble polymerization initiating agent and oil-soluble polymerization initiating agent. For example, the initiating agent can be inorganic initiating agent (such as peroxysulphate), organic peroxides or azo compound. These initiating agents can be used separately or in combination with an oxidation-reduction system that is composed of sulfites, thiosulfate, formaldehyde sodium sulphoxylate. In the initiating agents of the present invention, the persulfates can be selected from sodium persulfate, potassium persulfate, ammonium persulfate etc. The organic peroxides can be selected from tert-butyl hydroperoxide, benzoyl peroxide etc.

The toughening modifiers with the required elongation at break will be obtained by adjusting suitable stirring intensity, particle sizes of raw materials, reaction temperature, rate of chlorine inlet and amount of the chlorine inlet according to use purposes and reaction conditions.

In summary, the toughening modifiers of the present invention can be obtained by a one-step, two-step or multi-step reaction. If a two-step reaction or a multi-step reaction is applied, it should be confirmed that a previous step must be completed before adding the reactants of the next step. Accordingly, the reactants of each step will not mix with the reactants of the following step.

The obtained polymer rubber particles are centrifuged, washed with water and dried by common methods according to the requirement after the reaction is completed.

The present invention will be illustrated in detail by the examples and the comparative examples below, unless otherwise defined, all the "parts" and "%" are based on weight. It should be understood that the present invention shall not be limited to those examples.

<Testing Method>

(1) Test of Elongations at Break of Toughening Modifiers.

The test is carried out according to GB/T 528-2009 (test of strain performances of tensile stress of vulcanized rubber or thermoplastic rubber). The sample is prepared according to the regulations of the section 5.9 of HG/T2704-2010: pelleting temperature 85±2° C., mixing time 3 min, compression molding temperature 130° C., temperature is kept constant for 5 min, and pressure is maintained for 2 min. A type 1 dumb-bell shape sample is used, stretching velocity of the tensile machine is 500 mm/min. According to the regulations of GB/T2941-2006, the temperature of the test is 24-25° C.; and the relative humidity is 50±5%.

The tensile machine is the modified universal test machine of the type UTM-1422 (Jin Jian Testing maching Ltd., Chengde), the specific parameters are as follows:

|  |  | Type | UTM-1422 |
|---|---|---|---|
| Testing parameters | Maximum testing force | 10 kN |
|  | Degree of testing machine | 0.5 degree |
|  | Measuring range of testing forces | 0.2%-100% FS |
|  | Relative error of the indicating value of testing forces | ±0.5% |
|  | Resolution capacity of testing forces | 1/200000 |
|  | Measuring range of deformation | 0.2-100% FS |
|  | Relative error of the indicating value of deformations | Within ±0.50% |
|  | Resolution capacity of deformations | 1/200000 |
|  | Measuring range of gross distortions | 5-800 mm |
|  | Relative error of the indicating value of gross distortions | Within ±0.50% |
|  | Resolution capacity of gross distortions | 0.0125 mm |
|  | Test of bending depletion extensometer | 15 mm |
|  | Resolution capacity of bending depleting extensometer | 0.001 mm |

| | Type | UTM-1422 |
|---|---|---|
| | Accuracy of bending depleting extensometer | 0.005 mm |
| | Relative error of the indicating value of beam displacements | Within ±0.50% |
| | Resolution capacity of displacements | 0.001 mm |
| Control parameters | Adjusting range of force control rates | 0.005-5% FS/S |
| | Relative error of force control rates | Within ±1% of the set point |
| | Adjusting range of deformation rates | 0.02-5% FS/S |
| | Relative error of deformation control rates | Within ±2% of the set point when the rate is less than 0.05% FS; within ±0.5% of the set point when the rate is larger than or equal to 0.05% |
| | Adjusting range of beam rates | 0.001-500 mm/min |
| | Beam rates; relative error | Within ±1.0% of the set point when the rate is less than 0.05 mm/min; within ±0.5% of the set point when the rate is larger than or equal to 0.05 m/min; |
| | Control range of constant forces, constant deformations, constant displacements | 0.5%-100% FS |
| | Control accuracy of constant forces, constant deformations, constant displacements | Within ±0.1% of the set point when the set point is greater than or equal to 10% FS; within ±1% of the set point when the set point is less than 10% FS; |
| | Effective testing width | 400 mm |
| | Maximum stretch stroke | 1400 mm |

(2) Test of Elongations at Break of Polyvinyl Chloride Compositions.

The test is carried out according to GB/T 1040.1-2006 (Test of the tensile performance of plastics, Part 1: General rules). The experiment conditions are carried out according to the regulations of GB/T1040.2-2006 (Test of the tensile performance of plastics, Part 2: Experiment condition of molded plastics and extruded plastics). The sample is a 1B type dumb-bell shape sample. The stretching velocity of the tensile machine is 5 mm/min. According to the regulations of GB/T2918-1998, the temperature of the test is 24-25° C.; and the relative humidity is 50±5%.

(3) Test of Reaction Conversions

Conversion of the reaction is calculated according to the following equation:

Reaction conversion=(Weight of the generated rubber plastics/the amount of the reactant fed)× 100%; with the amount of chlorine gas calculated based on half of the actual feeding amount when chlorine gas is one of the reactant.

(4) Test of Powder Sizes

The test is carried out according to Taylor Sieve Method. The specific test method is as follows: 200 g sample is screened for 10 minutes by vibrating screening on different sieves, then the weight of the particles on the sieve is weighed, the particle size when the particles that are 50% of the weight of the particles are screened is chosen to be the average particle size D50.

(5) Test of the Melt Index of High Density Polyvinyl Chloride (HDPE)

The test is carried out using ASTM 01238, the temperature is 190° C., the load is 5.0 kg, the unit of melt index is g/10 min.

<Molding Conditions and Standards of Extruding Machine>

The temperature of the sections of extruding machine that used for extruding polyvinyl chloride sheets: C1=165° C., C2=175° C., C3=185° C. The temperature of die head=185° C.

The standards of extruding machine are as follows:

Screw: length-to-diameter ratio (L/D)=25, compression ratio=2.5, rotating rate of main engine=60 rounds/min.

Die head: width=100 mm, thickness=3 mm.

Example 1

(1) Preparation of Toughening Modifiers 0.28 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.04 parts of polyoxyethylene lauryl ether was added as an emulsifying agent, then water was added, the total amount of water used and the amount of all the auxiliary raw materials were 250 parts. Then 35 parts of high density polyethylene with the average particle size D50 of 95 μm, 0.025 parts of benzoyl peroxide were added. After the temperature of the reaction materials were increased to 80° C. under the stirring rate of 85 rounds/min, 42 parts by weight of chlorine gas was inlet, then the temperature was increased to 135° C. while inletting chlorine gas. The time for increasing the temperature was 1 hour, the amount of the chlorine gas inlet during the temperature increasing was 19 parts, and the temperature increasing and the chlorine gas inlet were carried out simultaneously. The temperature was kept at 135-138° C. after reaching 135° C., the rest 23 parts of chlorine gas was inlet at the rate of 23 parts/hour. The rubber powder with an elongation at break of 2230% was obtained after centrifugation and drying (sample 1). The conversion of the reaction was 99.5%, the content of chlorine (i.e. the weight percentage of chlorine, the contents of chlorine below are represented in the same way) was 37.3%, the average particle size D50 of the powder was 190 μm.

(2) Preparation of Polyvinyl Chloride Compositions and Polyvinyl Chloride Sheet Products 100 parts of polyvinyl chloride (S-1000, the average degree of polymerization is 1000, produced by QILU subsidiary of SINOPEC), 8 parts of the above rubber powder (sample 1), 3 parts of MBS (RK-56P), 5 parts of calcium carbonate, 5 parts of titanium dioxide, 2 parts of methyltin heat stabilizer (the content of tin is 18%), 1 part of calcium stearate, 0.5 part of paraffin (the melt point is 60° C.), 0.5 part of polyethylene wax (the melt point is 110° C.) were added to a high-speed mixer, then stirring was started, the temperature inside was increased to 120° C. Polyvinyl chloride composition powders were obtained after cooling. The composition was extruded by the extruding machine to obtain polyvinyl chloride composition sheet products. The elongation at break was measured, the results of the experiment can be seen in table 1.

Example 2

(1) Preparation of Toughening Modifiers

Water, 0.1 part of polymethyl methacrylate-acrylate copolymer dispersing agent, 0.05 part of benzoyl peroxide were added to a reactor equipped with a stirring rake, the total amount of water used and the amount of all the auxiliary raw materials were 250 parts. 30 parts of sample 1, 0.1 part of dodecyl sodium sulfate were added then. Under the stirring rate of 60 rounds/min, nitrogen gas was inlet and the temperature of the reaction material was increased to 80° C. simultaneously. Then 3 parts of butyl acrylate and 1 part of methyl methacrylate were added, the temperature was kept at 80-85° C., after 3 hours of reaction, the temperature was cooled to below 40° C. The rubber powder with an elongation at break of 2260% was obtained after centrifugation and drying (sample 2).

The conversion of the reaction was 98.3%, the average particle size D50 of the powder was 310 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Example 3

(1) Preparation of Toughening Modifiers 0.28 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.04 parts of polyoxyethylene lauryl ether was added as an emulsifying agent, then water was added, the total amount of water used and the amount of all the auxiliary raw materials were 250 parts. Then 35 parts of high density polyethylene with the average particle size D50 of 95 μm, 0.025 parts of benzoyl peroxide were added. After the temperature of the reaction material was increased to 85° C. under the stirring rate of 85 rounds/min, 42 parts of chlorine gas was inlet, then the temperature was increased to 135° C. while inletting chlorine gas. The time for increasing the temperature was 1 hour, the amount of the chlorine gas inlet while increasing the temperature was 19 parts, and the temperature increasing and the chlorine gas inlet were carried out simultaneously. The temperature was kept at 135-138° C. after reaching 135° C., and the rest 23 parts of chlorine gas was inlet at the rate of 23 parts/hour. The rubber powder with an elongation at break of 2320% was obtained after centrifugation and drying (sample 3).

The conversion of the reaction was 99.3%, the content of chlorine was 37.3%. The average particle size D50 of the powder was 200 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Example 4

(1) Preparation of Toughening Modifiers 0.28 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.04 parts of polyoxyethylene lauryl ether was added as an emulsifying agent, then water was added, the total amount of water used and the amount of all the auxiliary raw materials were 250 parts. Then 35 parts of high density polyethylene with the average particle size D50 of 95 μm, 0.025 part of benzoyl peroxide were added. After the temperature of the reaction material was increased to 95° C. under the stirring rate of 85 rounds/min, 42 parts of chlorine gas was inlet, then the temperature was increased to 135° C. while inletting chlorine gas. The time for increasing the temperature was 1 hour, the amount of the chlorine gas inlet while increasing the temperature was 19 parts, and the temperature increasing and the chlorine gas inlet were carried out simultaneously. The temperature was kept at 135-138° C. after reaching 135° C., and the rest 23 parts of chlorine gas was inlet at the rate of 23 parts/hour. The rubber powder with an elongation at break of 2380% was obtained after centrifugation and drying (sample 4).

The conversion of the reaction was 99.1%, the content of chlorine was 37.1%. The average particle size D50 of the powder was 210 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Example 5

(1) Preparation of Toughening Modifier 0.32 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.05 parts of polyoxyethylene lauryl ether was added as an emulsifying agent, then water was added, the total amount of water used and the amount of all the auxiliary raw materials were 250 parts. Then 35 parts of high density polyethylene with the average particle size D50 of 95 μm, 0.03 part of benzoyl peroxide were added. After the temperature of the reaction material was increased to 100° C. under the stirring rate of 100 rounds/min, 42 parts of chlorine gas was inlet, then the temperature was increased to 135° C. while inletting chlorine gas. The time for increasing the temperature was 1 hour, the amount of the chlorine gas inlet while increasing the temperature was 19 parts, and the temperature increasing and the chlorine gas inlet were carried out simultaneously. The temperature was kept at 135-138° C. after reaching 135° C., and the rest 23 parts of chlorine gas was inlet at the rate of 23 parts/hour. The rubber powder with an elongation at break of 2430% was obtained after centrifugation and drying (sample 5).

The conversion of the reaction was 98.9%, the content of chlorine was 37.0%. The average particle size D50 of the powder was 2301 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Example 6

(1) Preparation of Toughening Modifiers 0.34 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.06 parts of polyoxyethylene lauryl ether was added as an emulsifying agent, then water was added, the total amount of water used and the amount of all the auxiliary raw materials were 250 parts. Then 35 parts of high density polyethylene with the average particle size D50 of 95 μm, 0.035 part of benzoyl peroxide were added. After the temperature of the reaction material was increased to 105° C. under the stirring rate of 125 rounds/min, 42 parts of chlorine gas was inlet, then the temperature was increased to 135° C. while inletting chlorine gas. The time for increasing the temperature was 1 hour, the amount of the chlorine gas inlet while increasing the temperature was 19 parts, and the temperature increasing and the chlorine gas inlet were carried out simultaneously. The temperature was kept at 135-138° C. after reaching 135° C., and the rest 23 parts of chlorine gas was inlet at the rate of 23 parts/hour. The rubber powder with an elongation at break of 2490% was obtained after centrifugation and drying (sample 6).

The conversion of the reaction was 98.5%, the content of chlorine was 36.9%. The average particle size D50 of the powder was 250 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Example 7

(1) Preparation of Toughening Modifiers 0.35 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.07 parts of polyoxyethylene lauryl ether was added as an emulsifying agent, then water was added, the total amount of water used and the amount of all the auxiliary raw materials were 250 parts. Then 35 parts of high density polyethylene with the average particle size D50 of 80 μm, 0.035 part of benzoyl peroxide were added. After the temperature of the reaction material was increased to 80° C. under the stirring rate of 120 rounds/min, 42 parts of chlorine gas was inlet, then the temperature was increased to 135° C. while inletting chlorine gas. The time for increasing the temperature was 1 hour, the amount of the chlorine gas inlet while increasing the temperature was 18 parts, and the temperature increasing and the chlorine gas inlet were carried out simultaneously. The temperature was kept at 135-138° C. after reaching 135° C., and the rest 24 parts of chlorine gas was inlet at the rate of 24 parts/hour. The rubber powder with an elongation at break of 2530% was obtained after centrifugation and drying (sample 7).

The conversion of the reaction was 99.5%, the content of chlorine was 37.3%. The average particle size D50 of the powder was 180 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Example 8

(1) Preparation of Toughening Modifiers 0.45 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.07 parts of polyoxyethylene lauryl ether was added as an emulsifying agent, then water was added, the total amount of water used and the amount of all the auxiliary raw materials were 250 parts. Then 35 parts of high density polyethylene with the average particle size D50 of 73 μm, 0.035 part of benzoyl peroxide were added. After the temperature of the reaction material was increased to 90° C. under the stirring rate of 125 rounds/min, 42 parts of chlorine gas was inlet, then the temperature was increased to 135° C. while inletting chlorine gas. The time for increasing the temperature was 1 hour, the amount of the chlorine gas inlet while increasing the temperature was 18 parts, and the temperature increasing and the chlorine gas inlet were carried out simultaneously. The stirring rate was increased to 130 rounds/min and the temperature was kept at 137-140° C. after the temperature reaching 137° C., and the rest 24 parts of chlorine gas was inlet at the rate of 24 parts/hour. The rubber powder with an elongation at break of 2640% was obtained after centrifugation and drying (sample 8).

The conversion of the reaction was 99.5%, the content of chlorine was 37.3%. The average particle size D50 of the powder was 170 μm.

(2) Preparation of Polyvinyl Chloride Compositions and Polyvinyl Chloride Sheet Products The preparation method of polyvinyl chloride composition and polyvinyl chloride sheet products is the same as that of example 1. The elongation at break was measured; the results of the experiment can be seen in table 1.

Example 9

(1) Preparation of Toughening Modifiers 0.30 part of water-soluble methyl methacrylate-acrylic acid copolymer was added as a dispersing agent to a 30 L reactor that is equipped with a stirring rake, 0.28 parts of polyoxyethylene lauryl ether was added as an emulsifying agent, then water was added, the total amount of water used and the amount of all the auxiliary raw materials were 250 parts. Then 25 parts of sample 8, 0.12 part of potassium persulfate were then added. After the temperature of the reaction material was increased to 80° C. under the stirring rate of 60 rounds/min, 2 parts of octyl acrylate and 1 part of butyl methacrylate were added then. The temperature was kept at 80-85° C. and was cooled to below 40° C. after 4 hours of reaction. The rubber powder with an elongation at break of 2725% was obtained after centrifugation and drying (sample 9).

The conversion of the reaction was 97.9%. The average particle size D50 of the powder was 330 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Example 10

(1) Preparation of Toughening Modifiers 0.45 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.07 parts of polyoxyethylene lauryl ether was added as an emulsifying agent, then water was added, the total amount of water used and the amount of all the auxiliary raw materials were 250 parts. Then 35 parts of high density polyethylene with the average particle size D50 of 60 μm, 0.035 part of benzoyl peroxide were added. After the temperature of the reaction material was increased to 85° C. under the stirring rate of 130 rounds/min, 42 parts of chlorine gas was inlet, then the temperature was increased to 135° C. while inletting chlorine gas. The time for increasing the temperature was 1 hour, the amount of the chlorine gas inlet while increasing the temperature was 18 parts, and the temperature increasing and the chlorine gas inlet were carried out simultaneously. The stirring rate was increased to 135 rounds/min and the temperature was kept at 137-140° C. after the temperature reaching 137° C. The rest 24 parts of chlorine gas was inlet at the rate of 24 parts/hour. The rubber powder with an elongation at break of 2930% was obtained after centrifugation and drying (sample 10).

The conversion of the reaction was 99.5%, the content of chlorine was 37.3%. The average particle size D50 of the powder was 160 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Comparative Example 1

(1) Preparation of Modifiers 0.20 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.30 part of polyoxyethylene lauryl ether was added as an emulsifying agent, then water was added, the total amount of water used and the amount of all the auxiliary raw materials were 250 parts. Then 35 parts of high density polyethylene with the average particle size D50 of 1601 μm, 0.15 part of benzoyl peroxide were added. After the temperature of the reaction material was increased to 80° C. under the stirring rate of 90 rounds/min, 42 parts of chlorine gas was inlet, then the temperature was increased to 135° C. while inletting chlorine gas. The time for increasing the temperature was 1 hour, the amount of the chlorine gas inlet while increasing the temperature was 25 parts, and the temperature increasing and the chlorine gas inlet were carried out simultaneously. The stirring rate was increased to 140 rounds/min and the temperature was kept at 135-137° C. after the temperature reaching 135° C., the rest 17 parts of chlorine gas was inlet at the rate of 16 parts/hour. The rubber powder with an elongation at break of 2030% was obtained after centrifugation and drying (comparative sample 1).

The conversion of the reaction was 99.0%, the content of chlorine was 37.1%. The average particle size D50 of the powder was 260 μm.

(2) Preparation of Polyvinyl Chloride Compositions and Polyvinyl Chloride Sheet Products The preparation method of polyvinyl chloride composition and polyvinyl chloride sheet products is the same as that of example 1. The elongation at break was measured; the results of the experiment can be seen in table 1.

Comparative Example 2

(1) Preparation of Modifiers 0.35 part of water-soluble methyl methacrylate-acrylic acid copolymer was added as a dispersing agent to a reactor that is resistant to the erosion of chloric acid and is equipped with a zirconium-made stirring rake with both top and bottom ends fixed to the reactor, 0.40 part of polyoxyethylene lauryl ether was added as an emulsifying agent, then water was added, the total amount of water used and the amount of all the auxiliary raw materials were 250 parts. Then 35 parts of high density polyethylene with the average particle size D50 of 180 μm, 0.15 part of benzoyl peroxide were added. After the temperature of the reaction material was increased to 80° C. under the stirring rate of 120 rounds/min, 42 parts of chlorine gas was inlet, then the temperature was increased to 137° C. while inletting chlorine gas. The time for increasing the temperature was 1 hour, the amount of the chlorine gas inlet while increasing the temperature was 25 parts, and the temperature increasing and the chlorine gas inlet were carried out simultaneously. The stirring rate was increased to 125 rounds/min and the temperature was kept at 137-140° C. after the temperature reaching 137° C., the rest 17 parts of chlorine gas was inlet at the rate of 15 parts/hour. The rubber powder with an elongation at break of 1630% was obtained after centrifugation and drying (comparative sample 2).

The conversion of the reaction was 99.0%, the content of chlorine was 37.1%. The average particle size D50 of the powder was 280 μm.

(2) Preparation of Polyvinyl Chloride Compositions and Polyvinyl Chloride Sheet Products The preparation method of polyvinyl chloride compositions and polyvinyl chloride sheet products is the same as that of example 1. The elongation at break was measured; the results of the experiment can be seen in table 1.

Comparative Example 3

Preparation of Modifiers 0.35 part of water-soluble methyl methacrylate-acrylic acid copolymer was added as a dispersing agent to a reactor that is equipped with a stirring rake with one end fixed to the reactor, 0.40 part of polyoxyethylene lauryl ether was added as an emulsifying agent, then water was added, the total amount of water used and the amount of all the auxiliary raw materials were 250 parts. Then 30 parts of high density polyethylene with the average particle size D50 of 80 μm, 0.15 part of benzoyl peroxide were added. After the temperature of the reaction material was increased to 80° C. under the stirring rate of 120 rounds/min, 35 parts of chlorine gas was inlet, then the temperature was increased to 137° C. while inletting chlorine gas. The time for increasing the temperature was 1 hour, the amount of the chlorine gas inlet while increasing the temperature was 15 parts, and the temperature increasing and the chlorine gas inlet were carried out simultaneously. The stirring rate was increased to 140 rounds/min and the temperature was kept at 137-140° C. after the temperature reaching 137° C., the rest 20 parts of chlorine gas was inlet at the rate of 20 parts/hour. When the amount of the chlorine gas inlet was 6 parts at the temperature above 137V, the viscosity of the reaction liquid was increased, the stirring rake started to sway vibrately and so did the rector, the pressure inside the reactor started to increase quickly, the rate of reaction of chlorination decreased dramatically. In order to prevent the occurrence of safety accident, the inlet of chlorine gas was stopped and the temperature was decreased quickly to stop the reaction. The reaction was failed.

TABLE 1

| Number | Elongation at break of polyvinyl chloride composition sheet products (%) | Elongation at break of rubber powders (%) |
| --- | --- | --- |
| Example 1 | 243 | 2230 |
| Example 2 | 249 | 2260 |
| Example 3 | 256 | 2320 |
| Example 4 | 260 | 2380 |
| Example 5 | 273 | 2430 |
| Example 6 | 278 | 2490 |
| Example 7 | 282 | 2530 |
| Example 8 | 285 | 2640 |
| Example 9 | 292 | 2725 |
| Example 10 | 301 | 2930 |
| Comparative example 1 | 232 | 2030 |
| Comparative example 2 | 196 | 1630 |

From table 1, it can be seen that the larger the elongations at break of the toughening modifiers are, the larger the elongations at break of the polyvinyl chloride composition sheet products are, and thus the better the toughnesses of the polyvinyl chloride composition products are.

Examples 11-14

Except the amount of use of the toughening modifier (sample 7) in the polyvinyl chloride composition were changed, the rest of the steps and the conditions are the same of that of example 7. In examples 11, 12, 13 and 14, the amount of use of sample 7 were 6 parts, 7 parts, 9 parts and 11 parts respectively. The experiments results can be seen in table 2.

Comparative Examples 4-5

Except the amount of use of the toughening modifier (sample 7) in the polyvinyl chloride composition were changed, the rest of the steps and the conditions are the same of that of example 7. In the comparative examples 4 and 5, the amounts of use of sample 7 were 1 part, 1.8 parts respectively. The experiments results can be seen in table 2.

Comparative Example 6

Except the amount of use of the toughening modifier (sample 7) in the polyvinyl chloride composition were changed, the rest of the steps and the conditions are the same of that of example 7. In the comparative examples 7, the amount of use of sample 7 was 28 parts. Polyvinyl chloride composition cannot be molded by extrusion of extruding machine because of the poor processability of the composition. The experiments results can be seen in table 2.

TABLE 2

| | Sample 7 (Parts by weight) | Elongations at break of polyvinyl composition sheet products (%) |
| --- | --- | --- |
| Example 11 | 6 | 233 |
| Example 12 | 7 | 271 |
| Example 13 | 9 | 305 |
| Example 14 | 11 | 313 |
| Comparative example 4 | 1 | 110 |
| Comparative example 5 | 1.8 | 116 |
| Comparative example 6 | 28 | — |

It can be seen from table 2 that the higher the amounts of use of the toughening modifiers, the larger the elongations at break of the polyvinyl chloride compositions are. However, the elongations at break of the polyvinyl chloride compositions are very low when the amounts of use of the toughening modifiers are less than 2 parts. When the amounts of use of the toughening modifiers are larger than 16 parts, the polyvinyl chloride compositions can hardly be molded by processing.

The invention claimed is:

1. A polyvinyl chloride composition, comprising the following components based on parts by weight:
   (a) 100 parts polyvinyl chloride resin, and
   (b) 2-16 parts toughening modifier;
   wherein said toughening modifier comprises a rubber powder with an elongation at break greater than 2201% to 3500% and 5-45 wt % weight percentage of chlorine;
   wherein said toughening modifier is selected from the group consisting of: chlorinated polyethylenes, copolymers of chlorinated polyethylene and (meth)acrylate, or the mixtures of chlorinated polyethylene and (meth)acrylate polymer;
   said elongation at break is tested by GB/T528-2009;
   wherein the weight percentage of chlorine is tested by the method A of GB/T7139-2002.

2. The polyvinyl chloride composition according to claim 1, further comprising the following components based on parts by weight:
   (a) 0.5-5 parts stabilizer,
   (b) 0-50 parts filler,
   (c) 0-50 parts wood powder,
   (d) 0-10 parts polymers that comprise acrylates,
   (e) 0-8 parts anti-impact modifier,
   (f) 0-5 parts lubricant, and
   (g) 0-10 parts pigment.

3. The polyvinyl chloride composition according to claim wherein said polyvinyl chloride resin is a polyvinyl chloride homopolymer or a polyvinyl chloride copolymer;
   wherein the polyvinyl chloride copolymer comprises 80-99.99 wt % vinyl chloride units and 0.01-20 wt % units that are formed by other units;
   said other units are selected from one or more of vinyl acetate, propylene, styrene, $C_1$-$C_{12}$ alkyl esters of methacrylic acid, $C_1$-$C_{12}$ alkyl esters of acrylic acid.

4. The polyvinyl chloride composition according to claim wherein in said toughening modifiers, based on the total weight of the toughening modifier, the weight percentage of alkyl (meth)acrylate is 0-50 wt %.

5. The polyvinyl chloride composition according to claim wherein said stabilizer is selected from organotin heat stabilizers, calcium-zinc stabilizers, or lead salt stabilizers;
   said filler is selected from calcium carbonate, talc powders or white carbon black; said polymers that comprises acrylates are selected from copolymers that comprise alkyl methacrylates and alkyl acrylates;
   said anti-impact modifier is selected from copolymers formed from at least one of methyl methacrylate, styrene, and butadiene;
   said lubricant is selected from oxidized polyethylene wax, polyethylene wax, paraffin, stearic acid, glycerol monostearate, pentaerythritol stearate, pentaerythritol adipate, and calcium stearate; said pigment is selected from titanium white, carbon black, ultramarine pigment and fluorescent whitener.

6. A method of preparing the polyvinyl chloride composition according to claim 1, comprising:
   introducing 0.01-1.00 parts by weight of dispersing agent, 0.01-1.00 parts by weight of emulsifying agent to a reactor that is resistant to the erosion of chloric acid and is equipped with a stirring rake,
   adding a dispersing medium,
   wherein the total parts by weight of the dispersing agent, the emulsifying agent and the dispersing medium are 250 parts by weight;
   adding 15-40 parts by weight of high density polyethylene and 0.01-0.5 parts by weight of initiating agent,
   increasing the temperature of the reaction materials to 80-135° C. while stirring at a rate of 30-300 rounds/min;
   adding 5-25 parts by weight of chlorine gas, the inlet rate of chlorine gas must keep the reaction pressure to rise smoothly but not higher than the corresponding saturated steam pressure 0.05 MPa;
   wherein the chlorine is inlet such that below 50% of the total amount of chlorine gas is inlet below 135° C., and 50% of the total amount of chlorine gas is inlet above 135° C.

7. A preparation method of method of preparing the polyvinyl chloride composition according to claim 1, comprising:
(1) preparation of chlorinated polyethylene:
   introducing 0.01-1.00 parts by weight of dispersing agent and 0.01-1.00 parts by weight of emulsifying agent to a reactor that is resistant to the erosion of chloric acid and is equipped with a stirring rake,
   adding a dispersing medium,
   wherein the total parts by weight of the dispersing agent, the emulsifying agent and the dispersing medium are 250 parts by weight;
   adding 15-40 parts by weight of high density polyethylene and 0.01-0.5 parts by weight of initiating agent,
   increasing the temperature of the reaction materials to 80-135° C. under the stirring rate of 30-300 rounds/min;
   adding 5-25 parts by weight of chlorine gas, the inlet rate of chlorine gas must keep the reaction pressure to rise smoothly but not higher than the corresponding saturated steam pressure 0.05 MPa;
   wherein the chlorine is inlet such that below 50% of the total amount of chlorine gas is inlet below 135° C., and 50% of the total amount of chlorine gas is inlet above 135° C.;
(2) preparation of chlorinated polyethylene and (meth)acrylate copolymers:
   adding 0.01-1.00 parts by weight of dispersing agent, 0.01-0.50 parts by weight of initiating agent and a dispersing medium to the reactor,
   wherein the total parts by weight of the dispersing agent, the initiating agent and the dispersing medium are 250 parts by weight;
   adding 15-40 parts by weight of chlorinated polyethylene obtained in step (1) and 0-0.50 parts by weight of emulsifying agent, the stirring rate is maintained at 30-300 rounds/min,
   adding 1-40 parts by weight of alkyl (meth)acrylate after the temperature of the reaction materials are increased to 70-90° C., the reaction temperature is maintained at 80-85° C. for 2-5 hours, the temperature is then cooled to below 40° C.

8. The method of preparing the polyvinyl chloride composition according to claim 6, wherein the medium interface of said reactor comprises titanium-palladium alloy, zirconium, or tantalum that is resistant to the erosion of chloric acid; said stirring rake is a zirconium-made stirring rake that is resistant to the erosion of chloric acid, and the top and bottom ends of the stirring rake are fixed to the top and bottom of the reactor respectively and it can rotate freely.

9. The method of preparing the polyvinyl chloride composition according to claim 6, wherein the average particle size D50 of said high density polyethylene is 40-140 μm; the average particle size is obtained by the Taylor Sieve Method, the measurement is made specifically as follows: 200 g high density polyethylene is screened for 10 minutes by vibrating screening on different sieves, then the weight of the particles on the sieve is weighed, the particle size when particles that are 50% of the weight of the particles are screened is chosen to be the average particle size D50.

10. The method of preparing the polyvinyl chloride composition according to claim 9, wherein the melt index of said high density polyethylene is 0.2-4.0 g/10 min; said melt index is measured by ASTM D1238, the temperature is 190° C., the load is 5.0 kg.

11. A toughening modifier being selected from chlorinated polyethylene, or copolymer of chlorinated polyethylene and (meth)acrylate;
said toughening modifier comprises a rubber powder with an elongation at break higher than 2201% to 3500% and 5-45 wt % weight percentage of chlorine;
said elongation at break is measured by GB/T528-2009; the weight percentage of chlorine is measured by method A of GB/T7139-2002.

12. A method of preparing the toughening modifier according to claim 11, wherein said toughening modifier is chlorinated polyethylene, comprising:
introducing 0.01-1.00 parts by weight of dispersing agent and 0.01-1.00 parts by weight of emulsifying agent to a reactor that is resistant to the erosion of chloric acid and is equipped with a stirring rake,
adding a dispersing medium,
wherein the total parts by weight of the dispersing agent, the emulsifying agent and the dispersing medium are 250 parts by weight;
adding 15-40 parts by weight of high density polyethylene and 0.01-0.5 parts by weight of initiating agent, the temperature of the reaction materials are increased to 80-135° C. under the stirring rate of 30-300 rounds/min;
adding 5-25 parts by weight of chlorine gas, the inlet rate of chlorine gas must keep the reaction pressure to rise smoothly but not higher than the corresponding saturated steam pressure 0.05 MPa;
wherein the chlorine is inlet such that below 50% of the total amount of chlorine gas is inlet below 135° C., and 50% of the total amount of chlorine gas is inlet above 135° C.

13. The method of preparing the toughening modifier according to claim 11, wherein said toughening modifier is a copolymer of chlorinated polyethylene and (meth)acrylate, comprising:
(1) preparation of chlorinated polyethylene:
introducing 0.01-1.00 parts by weight of dispersing agent and 0.01-1.00 parts by weight of emulsifying agent to a reactor that is resistant to the erosion of chloric acid and is equipped with a stirring rake,
adding a dispersing medium,
wherein the total parts by weight of the dispersing agent, the emulsifying agent and the dispersing medium are 250 parts by weight;
adding 15-40 parts by weight of high density polyethylene and 0.01-0.5 parts by weight of initiating agent, the temperature of the reaction materials are increased to 80-135° C. under the stirring rate of 30-300 rounds/min;
adding 5-25 parts by weight of chlorine gas, the inlet rate of chlorine gas must keep the reaction pressure to rise smoothly but not higher than the corresponding saturated steam pressure 0.05 MPa;
wherein the chlorine is inlet such that below 50% of the total amount of chlorine gas is inlet below 135° C., and 50% of the total amount of chlorine gas is inlet above 135° C.;

(2) preparation of chlorinated polyethylene and (meth)acrylate copolymers:
adding 0.01-1.00 parts by weight of dispersing agent, 0.01-0.50 parts by weight of initiating agent and dispersing medium to the reactor,
wherein the total parts by weight of the dispersing agent, the initiating agent and the dispersing medium are 250 parts by weight;
adding 15-40 parts by weight of chlorinated polyethylene obtained in step (1) and 0-0.5 parts by weight of emulsifying agent, the stirring rate is maintained at 30-300 rounds/min,
adding 1-40 parts by weight of alkyl (meth)acrylate after the temperature of the reaction materials is increased to 70-90° C., the reacting temperature is maintained at 80-85° C. for 2-5 hours, the temperature is then cooled to below 40° C.

14. The polyvinyl chloride composition according to claim wherein said polyvinyl chloride resin is a polyvinyl chloride homopolymer or a polyvinyl chloride copolymer;
wherein the polyvinyl chloride copolymer comprises 80-99.99 wt % vinyl chloride units and 0.0120 wt % units that are formed by other units; said other units are selected from one or more of vinyl acetate, propylene, styrene, $C_1$-$C_{12}$ alkyl esters of methacrylic acid, $C_1$-$C_{12}$ alkyl esters of acrylic acid.

15. The polyvinyl chloride composition according to claim wherein in said toughening modifiers, based on the total weight of the toughening modifier, the weight percentage of alkyl (meth)acrylate is 0-50 wt %.

16. The method of preparing the polyvinyl chloride composition according to claim 7, wherein the medium interface of said reactor is made of titanium-palladium alloy, zirconium, or tantalum that is resistant to the erosion of chloric acid; said stirring rake is a zirconium-made stirring rake that is resistant to the erosion of chloric acid, and the top and bottom ends of the stirring rake are fixed to the top and bottom of the reactor respectively and it can rotate freely.

17. The method of preparing the polyvinyl chloride composition according to claim 7, wherein the average particle size D50 of said high density polyethylene is 40-140 μm; the average particle size is obtained by the Taylor Sieve Method, the measurement is made specifically as follows: 200 g high density polyethylene is screened for 10 minutes by vibrating screening on different sieves, then the weight of the particles on the sieve is weighed, the particle size when particles that are 50% of the weight of the particles are screened is chosen to be the average particle size D50.

* * * * *